United States Patent
Nakanishi et al.

(10) Patent No.: US 12,434,687 B2
(45) Date of Patent: Oct. 7, 2025

(54) VEHICLE CONTROLLER AND VEHICLE CONTROL METHOD

(71) Applicant: TOYOTA JIDOSHA KABUSHIKI KAISHA, Aichi-ken (JP)

(72) Inventors: Naoki Nakanishi, Nagoya (JP); Masato Yoshikawa, Toyota (JP); Mitsuru Yamaguchi, Ama (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 358 days.

(21) Appl. No.: 18/163,284

(22) Filed: Feb. 2, 2023

(65) Prior Publication Data
US 2023/0249671 A1 Aug. 10, 2023

(30) Foreign Application Priority Data
Feb. 7, 2022 (JP) .................. 2022-017309

(51) Int. Cl.
*B60W 20/40* (2016.01)
*B60W 10/02* (2006.01)
(Continued)

(52) U.S. Cl.
CPC .......... *B60W 20/40* (2013.01); *B60W 10/02* (2013.01); *B60W 10/06* (2013.01); *B60W 10/08* (2013.01);
(Continued)

(58) Field of Classification Search
CPC ...... B60W 20/40; B60W 10/02; B60W 10/06; B60W 10/08; B60W 40/02; B60W 2510/0208; B60W 2555/20; B60W 2710/083; B60W 2510/0609; B60W 2510/0628; B60W 2510/081;
(Continued)

(56) References Cited

U.S. PATENT DOCUMENTS

2014/0080663 A1* 3/2014 Nakanishi ............ B60W 10/02
  180/65.265
2016/0003177 A1 1/2016 Aikawa

FOREIGN PATENT DOCUMENTS

JP 24480794 * 3/1996
JP H11341607 A 12/1999
(Continued)

OTHER PUBLICATIONS

JP_24480794 English (Year: 2025).*
JP_2000110637 english (Year: 2025).*

*Primary Examiner* — Jelani A Smith
*Assistant Examiner* — Paul A Castro
(74) *Attorney, Agent, or Firm* — HAUPTMAN HAM, LLP (57) ABSTRACT

An electronic control unit includes processing circuitry. A hybrid electric vehicle has an electric traveling mode, in which the hybrid electric vehicle travels with a system clutch disengaged and an engine in a stopped state, and a hybrid traveling mode, in which the hybrid electric vehicle travels with the system clutch engaged and engine operating. The processing circuitry is configured to control, when the traveling mode is switched from the electric traveling mode to the hybrid traveling mode, a throttle opening degree of the engine at the time of completion of engagement of the system clutch in accordance with the atmospheric pressure such that a constant intake air amount is obtained regardless of the level of the atmospheric pressure.

6 Claims, 5 Drawing Sheets

(51) Int. Cl.
*B60W 10/06* (2006.01)
*B60W 10/08* (2006.01)
*B60W 40/02* (2006.01)

(52) U.S. Cl.
CPC ..... *B60W 40/02* (2013.01); *B60W 2510/0208* (2013.01); *B60W 2555/20* (2020.02); *B60W 2710/083* (2013.01)

(58) Field of Classification Search
CPC .......... B60W 2510/083; B60W 20/17; B60W 2510/0619; B60W 2510/0671; B60W 2510/0685; B60W 2540/10; B60W 2552/25; B60W 2555/40; B60W 2710/021; B60W 2710/0605; B60W 2710/0611; B60W 2710/0622; B60W 2710/0633; B60W 2710/0666; B60W 2710/085; B60W 10/26; B60K 6/383; B60K 2006/4825; B60K 6/48; B60K 6/38; B60K 6/387; Y02T 10/62
See application file for complete search history.

(56) References Cited

FOREIGN PATENT DOCUMENTS

| | | | | |
|---|---|---|---|---|
| JP | 2000110637 A | * | 4/2000 | ........... F02D 41/024 |
| JP | 2014058259 A | | 4/2014 | |
| JP | 2015-093667 A | | 5/2015 | |
| WO | 2014/128974 A1 | | 8/2014 | |

* cited by examiner

VEHICLE CONTROLLER AND VEHICLE CONTROL METHOD

RELATED APPLICATIONS

The present application claims priority of Japanese Application Number 2022-017309 filed on Feb. 7, 2022, the disclosure of which is hereby incorporated by reference herein in its entirety.

BACKGROUND

1. Field

The present disclosure relates to a vehicle controller that controls a hybrid electric vehicle.

2. Description of Related Art

Some hybrid electric vehicles are equipped with a hybrid system that includes an engine and a motor generator (MG). The engine and the motor generator are coupled to each other via a clutch. The hybrid system extracts drive force from a rotary shaft of the motor generator. A hybrid electric vehicle equipped with such a hybrid system has two traveling modes. One of the traveling modes is an electric traveling mode, in which the vehicle travels by drive force of the motor generator with the engine stopped and the clutch disengaged. The other traveling mode is a hybrid traveling mode, in which the vehicle travels with the clutch engaged. In such a hybrid electric vehicle, the traveling mode is set to the electric traveling mode when the vehicle is in a stopped state or traveling at a low speed. When the driver depresses the accelerator pedal to request acceleration of the vehicle, the traveling mode is switched from the electric traveling mode to the hybrid traveling mode.

Japanese Laid-Open Patent Publication No. 2014-058259 discloses a vehicle controller that controls such a hybrid electric vehicle. The vehicle controller of the document switches the traveling mode from the electric traveling mode to the hybrid traveling mode in the following procedure. First, the clutch is brought into a slipping state during traveling in the electric traveling mode, and the engine is started while being rotated by drive force of the motor generator. Next, when the engine starts rotating on its own, the engaging force of the clutch is temporarily reduced. Thereafter, when the engine rotation speed increases to a level at which the motor generator and the engine rotate synchronously, the clutch is re-engaged to complete the switching of the traveling mode to the hybrid traveling mode.

When the clutch is re-engaged, it is desirable to reduce the throttle opening degree to keep the engine torque at a level near 0 in order to prevent an abrupt change in the torque. After the re-engagement of the clutch, it is desirable to quickly increase the engine torque in order to accelerate the vehicle.

At a high altitude, at which the atmospheric pressure is relatively low, the intake air amount of the engine obtained at the same throttle opening degree is smaller than that at a low altitude. Thus, in a low atmospheric pressure environment such as a high altitude, an increase in the engine torque after the re-engagement of the clutch is delayed. As a result, occupants of the vehicle may experience poor acceleration.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle controller is configured to control a hybrid electric vehicle that includes a hybrid system as a drive source. The hybrid system includes an engine and a motor generator. The hybrid system includes a clutch disposed between an output shaft of the engine and a rotary shaft of the motor generator and is configured to extract drive force from the rotary shaft of the motor generator. The hybrid electric vehicle has two traveling modes that include an electric traveling mode, in which the hybrid electric vehicle travels with the engine in a stopped state and the clutch disengaged, and a hybrid traveling mode, in which the hybrid electric vehicle travels with the clutch engaged. The vehicle controller includes processing circuitry. The processing circuitry is configured to control, when the traveling mode is switched from the electric traveling mode to the hybrid traveling mode, a throttle opening degree of the engine at time of completion of engagement of the clutch in accordance with an atmospheric pressure such that the throttle opening degree is greater when the atmospheric pressure is relatively low than when the atmospheric pressure is relatively high.

In another general aspect, a vehicle control method for a hybrid electric vehicle that includes a hybrid system as a drive source is provided. The hybrid system includes an engine and a motor generator. The hybrid system includes a clutch disposed between an output shaft of the engine and a rotary shaft of the motor generator and is configured to extract drive force from the rotary shaft of the motor generator. The method includes: switching a traveling mode of the hybrid electric vehicle between an electric traveling mode, in which the hybrid electric vehicle travels with the engine in a stopped state and the clutch disengaged, and a hybrid traveling mode, in which the hybrid electric vehicle travels with the clutch engaged; and controlling, when the traveling mode is switched from the electric traveling mode to the hybrid traveling mode, a throttle opening degree of the engine at time of completion of engagement of the clutch in accordance with an atmospheric pressure such that the throttle opening degree is greater when the atmospheric pressure is relatively low than when the atmospheric pressure is relatively high.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle controller according to one embodiment will be described with reference to FIGS. 1 to 7.

<Configuration of Drive System of Hybrid Electric Vehicle>

Figure 1:
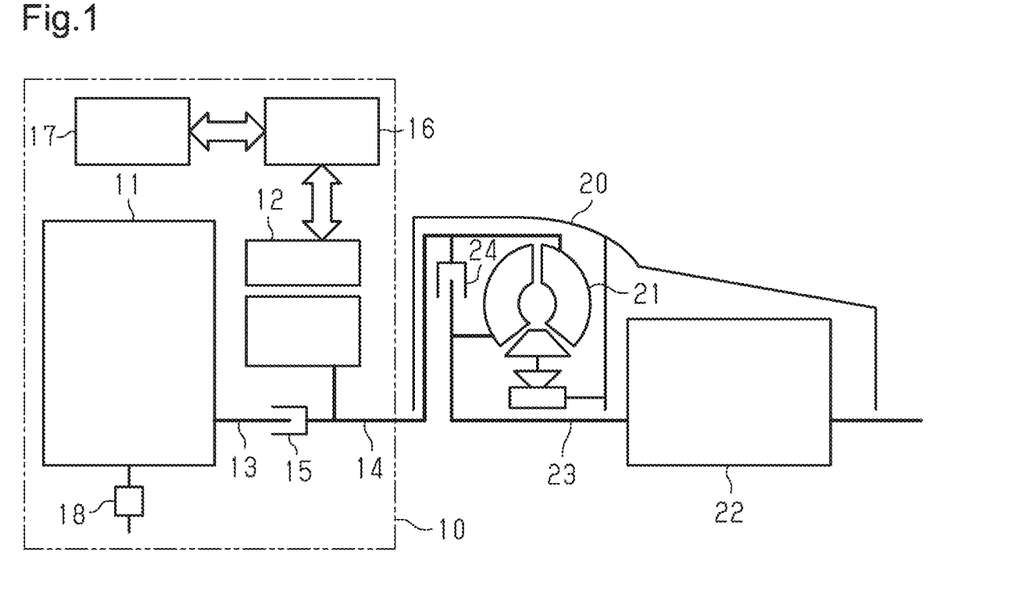
FIG. 1 is a diagram schematically showing a configuration of a drive system of a hybrid electric vehicle controlled by a vehicle controller according to one embodiment.

A configuration of a drive system of a hybrid electric vehicle controlled by the vehicle controller according to the present embodiment will be described with reference to FIG. 1. The hybrid electric vehicle includes a hybrid system 10 as a drive source. The hybrid system 10 includes an engine 11, a motor generator 12, and a system clutch 15. The hybrid system 10 is configured to extract drive force from a rotary shaft of the motor generator 12. The system clutch 15 is disposed between a crankshaft 13, which is an output shaft of the engine 11, and a system output shaft 14. The system clutch 15 selectively connects and disconnects the crankshaft 13 and the system output shaft 14. The hybrid system 10 includes an inverter 16 and a battery 17. The inverter 16 controls the amount of electric power transferred between the motor generators 12 and the battery 17. The hybrid system 10 includes a catalyst 18 that purifies exhaust gas of the engine 11.

The hybrid electric vehicle includes a transmission 20. The transmission 20 includes a torque converter 21 and a gearbox 22. The system output shaft 14 of the hybrid system 10 is connected to a gearbox input shaft 23, which is an input shaft of the gearbox 22, with a torque converter 21. The gearbox 22 changes the speed of rotation of the gearbox input shaft 23 and transmits the rotation to wheels of the hybrid electric vehicle. The transmission 20 is provided with a lock-up clutch 24 capable of directly connecting the system output shaft 14 and the gearbox input shaft 23 without using the torque converter 21.

<Configuration of Vehicle Controller>

Figure 2:
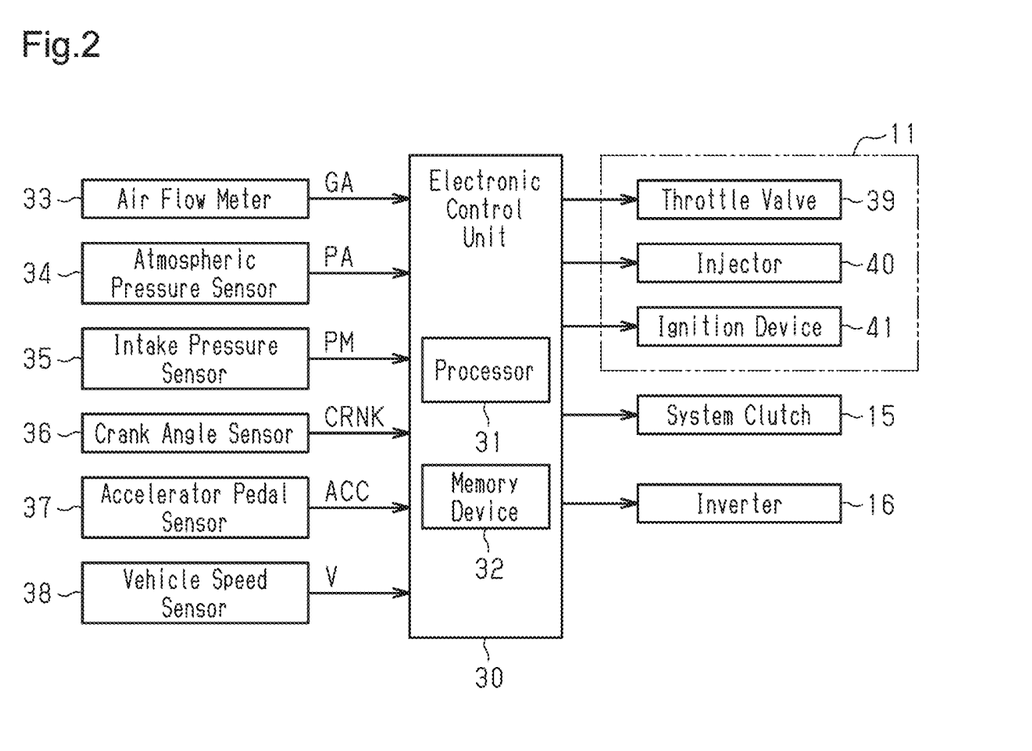
FIG. 2 is a diagram schematically showing a configuration of the vehicle controller.

Next, the configuration of the vehicle controller according to the present embodiment will be described with reference to FIG. 2. The vehicle controller includes an electronic control unit 30. The electronic control unit 30 includes a processor 31 and a memory device 32. The processor 31 executes various processes related to control of the vehicle. The memory device 32 stores programs and data for the control.

The electronic control unit 30 receives detection signals of various sensors provided in various portions of the hybrid electric vehicle. The sensors include an air flow meter 33, an atmospheric pressure sensor 34, an intake pressure sensor 35, a crank angle sensor 36, an accelerator pedal sensor 37, and a vehicle speed sensor 38. The air flow meter 33 is a sensor that detects an intake air flow rate GA of the engine 11. The atmospheric pressure sensor 34 is a sensor that detects an atmospheric pressure PA. The intake pressure sensor 35 is a sensor that detects an intake pressure PM of the engine 11. The crank angle sensor 36 is a sensor that detects a crank angle CRNK, which is a rotational phase of the crankshaft 13 of the engine 11. The accelerator pedal sensor 37 is a sensor that detects an accelerator operated amount ACC, which is an operated amount of the accelerator pedal of the hybrid electric vehicle by the driver. The vehicle speed sensor 38 is a sensor that detects a vehicle speed V of the hybrid electric vehicle. The electronic control unit 30 obtains an engine rotation speed, which is a rotation speed of the crankshaft 13 of the engine 11, from a detection result of the crank angle sensor 36.

The electronic control unit 30 controls the hybrid system 10 based on detection results of the sensors. For example, the electronic control unit 30 controls the operating state of the engine 11 by operating actuators of the engine 11, such as a throttle valve 39, an injector 40, and an ignition device 41. The electronic control unit 30 controls torque of the motor generator 12 by controlling the inverter 16. The electronic control unit 30 also controls the system clutch 15. The opening degree of the throttle valve 39 will hereafter be referred to as a throttle opening degree TA.

<Traveling Mode of Hybrid Electric Vehicle>

The hybrid electric vehicle has two traveling modes, which are an electric traveling mode and a hybrid traveling mode. The electric traveling mode is a traveling mode in which the vehicle travels in a state in which the engine 11 is in a stopped state and the system clutch 15 is disengaged. The hybrid traveling mode is a traveling mode in which the vehicle travels in a state in which the engine 11 is operating and the system clutch 15 is engaged. In the following description, traveling of the hybrid electric vehicle in the electric traveling mode will be referred to as electric traveling. Traveling of the hybrid electric vehicle in the hybrid traveling mode will be referred to as hybrid traveling.

During electric traveling, the electronic control unit 30 calculates a requested drive torque based on parameters such as the accelerator operated amount ACC and the vehicle speed V. The requested drive torque represents a requested value of a system shaft torque that is required for traveling of the hybrid electric vehicle. The system shaft torque represents torque transmitted to the transmission 20 by the system output shaft 14 of the hybrid system 10. The electronic control unit 30 controls the inverter 16 such that electric power required to generate a torque corresponding to the requested drive torque is supplied to the motor generator 12 from the battery 17.

During hybrid traveling, the electronic control unit 30 calculates a requested drive torque in the same manner as during electric traveling. Further, during hybrid traveling, the electronic control unit 30 calculates a battery requested torque based on the amount of charge of the battery 17. The electronic control unit 30 controls the charged/discharged amount of the battery 17 so as to maintain the amount of charge of the battery 17 within a specified range. The battery requested torque represents a requested value of torque to be generated by the motor generator 12 for such a control of the charged/discharged amount. Next, the electronic control unit 30 calculates a difference obtained by subtracting the battery requested torque from the requested drive torque as a value of a requested engine torque, which is a requested value of the engine torque. Then, the electronic control unit 30 controls the opening degree of the throttle valve 39 of the engine 11 so as to ensure an intake air amount required to generate torque corresponding to the requested engine torque. Further, the electronic control unit 30 controls the inverter 16 such that the motor generator 12 generates torque corresponding to the battery requested torque.

<Control for Switching from Electric Traveling to Hybrid Traveling>

The electronic control unit 30 switches the traveling mode based on the vehicle speed V, the accelerator operated amount ACC, the amount of charge of the battery 17, and the like. Conditions under which the switching control from the electric traveling to the hybrid traveling is performed will now be described in detail. The electronic control unit 30 interrupts the electric traveling and starts the hybrid traveling when the requested drive torque increases to the vicinity of a maximum motor-generator (MG) torque during the electric traveling. The maximum MG torque represents a maximum value of torque that can be generated by the motor generator 12. The maximum MG torque is a value determined by the amount of charge of the battery 17 and an MG rotation speed. The MG rotation speed represents the rotation speed of the motor generator 12, that is, the rotation speed of the system output shaft 14. The maximum MG torque decreases as the amount of charge of the battery 17 decreases. Further, the maximum MG torque decreases as the MG rotation speed increases. The electronic control unit 30 also interrupts the electric traveling and starts the hybrid traveling when the amount of charge of the battery 17 falls below a certain value during the electric traveling.

Next, details of the control for switching from the electric traveling to the hybrid traveling will be described. As described above, during the electric traveling, the hybrid system 10 is in a state in which the engine 11 is stopped and the system clutch 15 is disengaged. When switching from the electric traveling to the hybrid traveling is requested, the electronic control unit 30 first starts engaging the system clutch 15. When the system clutch 15 starts being engaged, the coupling force between the crankshaft 13 and the system output shaft 14 generated by the system clutch 15 gradually increases. Then, the engine 11 enters into a cranking state, in which the crankshaft 13 is rotated by the torque of the motor generator 12. The electronic control unit 30 restarts the engine 11 by starting fuel injection and ignition when the engine rotation speed increases to or exceeds a certain value through cranking. The electronic control unit 30 restarts the engine 11 after setting the throttle opening degree TA to a specified starting opening degree. After the restart of the engine 11 and the engagement of the system clutch 15 are completed, the electronic control unit 30 starts the hybrid traveling.

Switching from the electric traveling to the hybrid traveling is often performed when the hybrid electric vehicle starts moving or accelerates. Therefore, at the time of switching to the hybrid traveling, the system shaft torque is desired to be increased quickly to ensure the acceleration performance of the hybrid electric vehicle.

Figure 3:
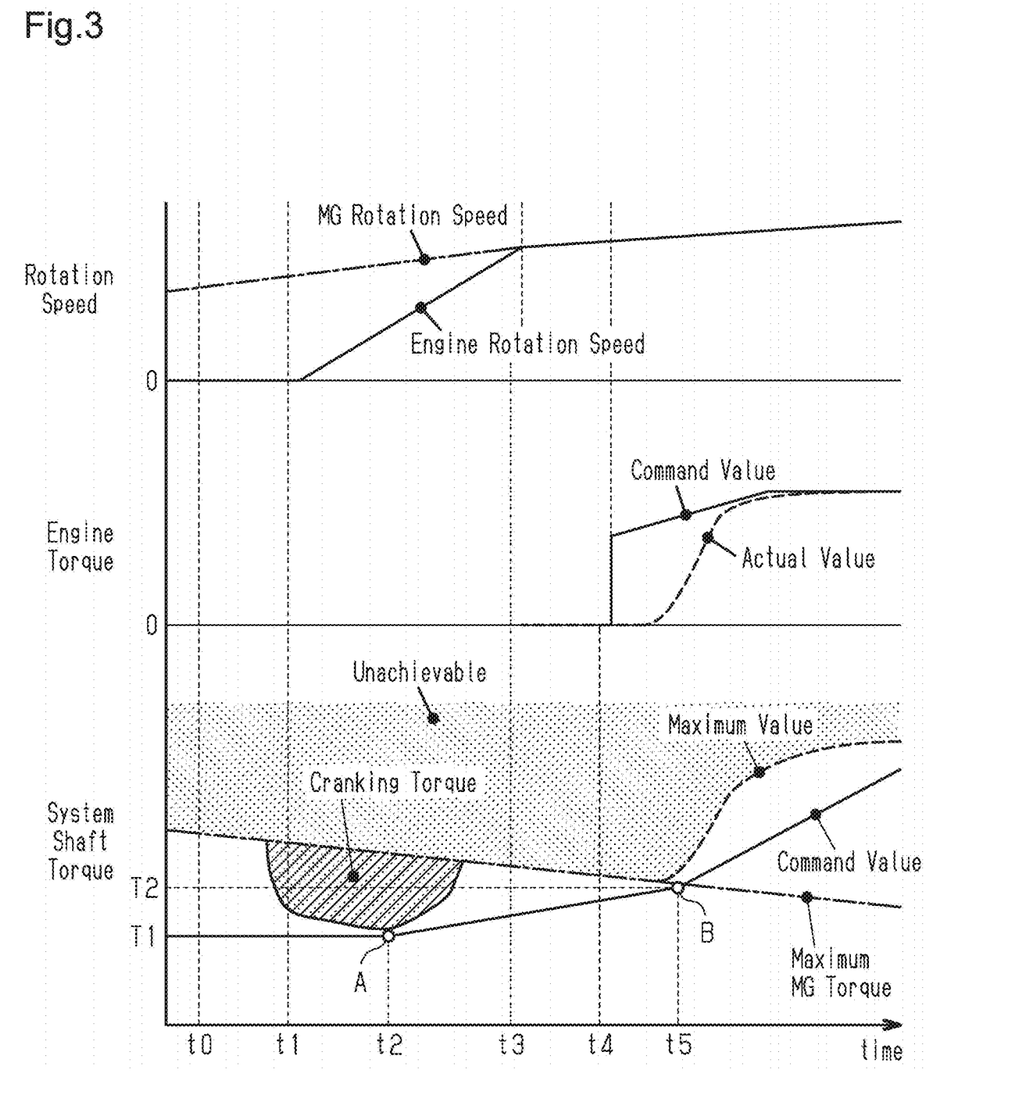
FIG. 3 is a timing diagram showing changes in an engine rotation speed and a MG rotation speed, changes in engine torque, and changes in a system shaft torque, at the time of switching a traveling mode in a vehicle controller according to a comparative example.

A control design of the hybrid system 10 that reduces sluggishness of acceleration at the time of switching from the electric traveling to the hybrid traveling will now be discussed with reference to FIG. 3. The graph in the upper part of FIG. 3 shows changes in the engine rotation speed and the MG rotation speed at the time of switching from the electric traveling to the hybrid traveling. The graph in the middle part of FIG. 3 shows changes in a command value and the actual value of the engine torque at the time of the switching. The graph in the lower part of FIG. 3 shows changes in a command value and the maximum value of the system shaft torque at the time of the switching. The graph in the lower part of FIG. 3 also shows changes in the maximum MG torque when switching from the electric traveling to the hybrid traveling is requested in a state in which the amount of charge of the battery 17 is the minimum amount that allows the electric traveling. Changes in each parameter shown in FIG. 3 are those of a comparative example to be compared with the vehicle controller of the present embodiment.

In the case of FIG. 3, engagement of the system clutch 15 is started at time t0. Then, the engine rotation speed starts being increased by cranking from time t1 on. The engine 11 is restarted at time t2. At subsequent time t3, the engine 11 and the motor generator 12 start rotating synchronously and the engagement of the system clutch 15 is completed.

If the engine 11 is generating torque when the system clutch 15 is engaged, an abrupt change in torque occurs. Therefore, after the engine 11 is restarted, the engine torque needs to be maintained in the vicinity of 0, for example, by retarding the ignition timing, until time t3, at which the engagement of the system clutch 15 is completed. The state in which the engine torque is 0 refers to a state in which the engine 11 is generating a minimum torque allowing the engine 11 to operate on its own.

When the engine 11 is restarted, the catalyst 18, which purifies exhaust gas, is in an inactive state. Activation of the catalyst 18 requires a certain period of time. Therefore, in order to ensure a low emission level of the engine 11, an increase in the engine torque in response to a request to the hybrid electric vehicle to travel (travel request) cannot be permitted until a certain period of time elapses after the restart of the engine 11. In the case of FIG. 3, activation of the catalyst 18 is completed at time t4. The electronic control unit 30 issues a command to increase the engine torque in response to a travel request at time t4. There is a delay in an increase in the engine torque with respect to the issuance of a command to increase the engine torque. Therefore, in the case of FIG. 3, the increase in the engine torque in response to the command at time t4 starts from the time t5.

During the period until time t3, at which engagement of system clutch 15 is completed, the maximum value of the system shaft torque that can be achieved by the hybrid system 10 is a value obtained by subtracting the cranking torque from the maximum MG torque. The cranking torque refers to torque of the motor generator 12 used to rotate the engine 11. After the engine 11 is restarted, the cranking torque decreases as the engine torque increases. After time t3, a value obtained by adding the engine torque to the maximum MG torque is the maximum value of the system shaft torque that can be achieved by the hybrid system 10.

The stippling in the graph in the lower part of FIG. 3 shows an unachievable range of the system shaft torque. Until time t2, the cranking torque needs to be ensured, and thus the system shaft torque can hardly be increased. In contrast, the system shaft torque can be increased by the engine torque after time t5. Accordingly, smooth and quick acceleration is possible if the system shaft torque is increased along a line segment A-B in the graph in the lower part of FIG. 3 during the period from time t2 to time t5. In this regard, the command value of the system shaft torque at time t2, at which the engine 11 starts generating torque, is set to a value T1, which is slightly less than a value obtained by subtracting the maximum value of the cranking torque from the maximum MG torque at that time. Further, the command value of the system shaft torque at time t5, at which the engine torque starts to increase, is set to a value T2, which is slightly less than the maximum MG torque at that time. During the period from time t2 to time t5, the command value of the system shaft torque is set to a value that increases at a constant gradient from the value T1 at time t2 to the value T2 at time t5. The electronic control unit 30 controls the torque of the motor generator 12 so as to obtain a system shaft torque that corresponds to the command value.

The hybrid electric vehicle is accelerated smoothly and quickly by setting the command value of the system shaft torque as described above at the time of switching from the electric traveling to the hybrid traveling. However, when the hybrid electric vehicle is traveling at a high altitude, the system shaft torque may be insufficient, resulting in sluggish acceleration of the hybrid electric vehicle.

Figure 4:
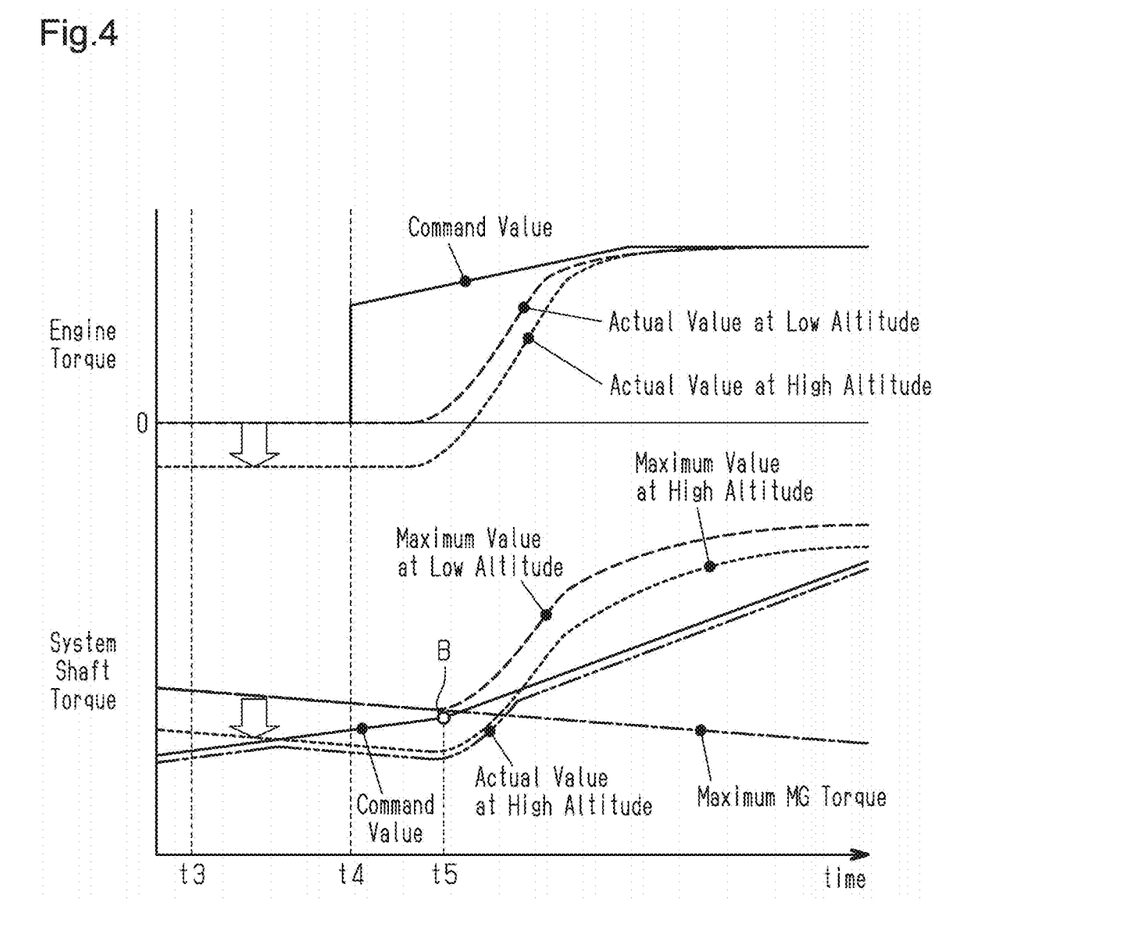
FIG. 4 is a timing diagram showing changes in the engine torque and changes in the system shaft torque at the time of switching the traveling mode in the vehicle controller according to the comparative example.

The graph in the upper part of FIG. 4 shows changes in the command value of the engine torque and the actual values of the engine torque at a low altitude and a high altitude during the period after time t3 in FIG. 3. The graph in the lower part of FIG. 4 shows changes other parameters during the same period. Specifically, the graph in the lower part shows the command value of the system shaft torque, the maximum value of the achievable system shaft torque at each of a low altitude and a high altitude, and the actual value of the system shaft torque at a high altitude. The graph in the lower part of FIG. 4 also shows changes in the maximum MG torque. Since the atmospheric pressure PA is low at a high altitude, the intake air amount of the engine 11 is smaller than that at a low altitude even if the throttle opening degree TA is the same. Therefore, the engine torque around time t5 is lower at a high altitude than at a low altitude. As a result, the system shaft torque around time t5 may fall below the command value at a high altitude. In this description, a high altitude and a low altitude each represent a level of the atmospheric pressure PA in the environment in which the hybrid electric vehicle is traveling, and do not necessarily coincide with the actual level of altitude. The low altitude represents a place at which the atmospheric pressure PA is the standard atmospheric pressure, and the high altitude represents a place at which the atmospheric pressure PA is lower than the standard atmospheric pressure.

<Engine Restart Throttle Control>

The electronic control unit 30 performs an engine restart throttle control for preventing sluggish acceleration at a high altitude. The engine restart throttle control will now be described.

Figure 5:
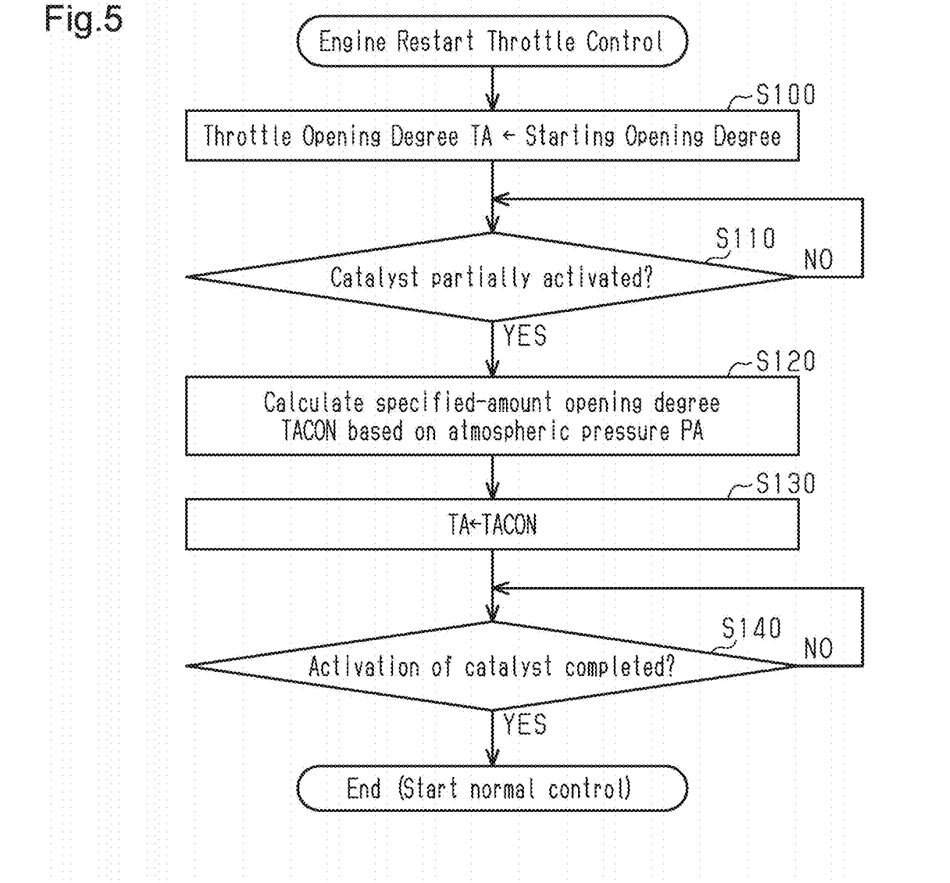
FIG. 5 is a flowchart of an engine restart throttle control executed by the vehicle controller shown in FIG. 2.

FIG. 5 shows a flowchart of the engine restart throttle control. The electronic control unit 30 controls the throttle opening degree TA according to the procedure shown in FIG. 5 during a period from the time when restart of the engine 11 for switching from the electric traveling to the hybrid traveling is requested to the time when a normal throttle control is started. The normal throttle control refers to a control of the throttle opening degree TA in response to a travel request, and is performed after activation of the catalyst 18 is completed.

When restart of the engine 11 is requested, the electronic control unit 30 sets the throttle opening degree TA to a starting opening degree as shown in step S100. Thereafter, the electronic control unit 30 maintains the throttle opening degree TA at the starting opening degree until the catalyst 18 is partially activated (S110: YES). Partial activation of the catalyst 18 refers to a state in which the catalyst 18 is activated to such an extent that a small amount of exhaust gas is purified. The electronic control unit 30 determines that the catalyst 18 is partially activated when the elapsed time from the restart of the engine 11 reaches a specified partial activation determination value. The partial activation determination value is set to a time shorter than a predicted value of the required time from restart of the engine 11 to completion of engagement of the system clutch 15.

When the catalyst 18 is partially activated, the electronic control unit 30 calculates a specified-amount opening degree TACON based on the atmospheric pressure PA in step S120. The specified-amount opening degree TACON represents a value of the throttle opening degree TA that is required to set the intake air amount of the engine 11 to a specified amount. The specified amount of intake air is set to a value that satisfies both of the following requirements 1 and 2. The requirement 1 is that the engine 11 being operated with the specified intake air amount discharges an amount of exhaust gas that can be purified by the catalyst 18 in a partially activated state. The requirement 2 is that when the system clutch 15 is engaged with the engine 11 being operated with the specified intake air amount, a torque shock generated by the engagement is within an allowable range. In step S130, the electronic control unit 30 sets the throttle opening degree TA to the calculated specified-amount opening degree TACON.

Figure 6:
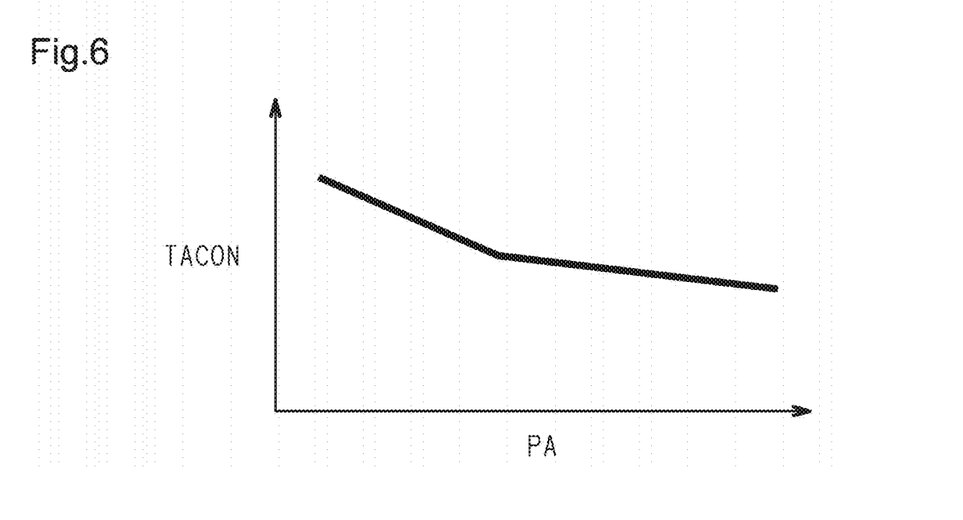
FIG. 6 is a graph showing a relationship between an atmospheric pressure and a specified-amount opening degree set by the vehicle controller shown in FIG. 2.

FIG. 6 shows the relationship between the atmospheric pressure PA and the specified-amount opening degree TACON. As shown in FIG. 6, the specified-amount opening degree TACON is set to be greater when the atmospheric pressure PA is relatively low than when the atmospheric pressure PA is relatively high.

Thereafter, the electronic control unit 30 maintains the throttle opening degree TA at the specified-amount opening degree TACON until activation of the catalyst 18 is completed (S140: YES). When activation of the catalyst 18 is completed, the electronic control unit 30 terminates the engine restart throttle control and starts the normal throttle control. The electronic control unit 30 determines that activation of the catalyst 18 is completed when the elapsed time from the restart of the engine 11 reaches a specified activation completion determination value. The activation completion determination value is set to time longer than a predicted value of the time required for the system clutch 15 to complete engagement from the restart of the engine 11. Therefore, the throttle opening degree TA has been set to the specified-amount opening degree TACON at the time of completion of engagement of the system clutch 15.

Operation and Advantages of Embodiment

Operation and advantages of the present embodiment will now be described.

Figure 7:
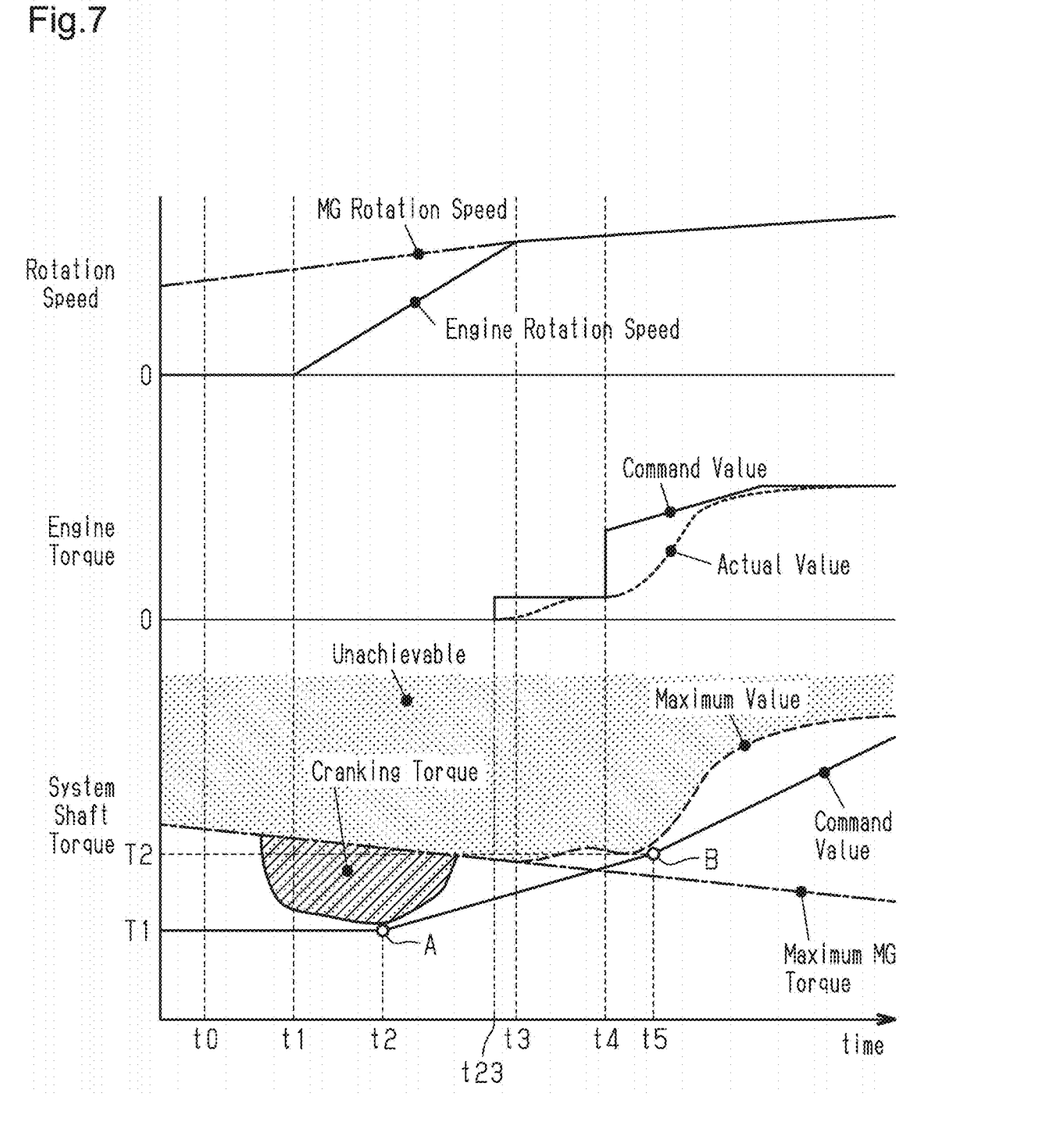
FIG. 7 is a timing diagram showing changes in an engine rotation speed and a MG rotation speed, changes in engine torque, and changes in a system shaft torque, at the time of switching a traveling mode in the vehicle controller shown in FIG. 2.

The graph in the upper part of FIG. 7 shows changes in the engine rotation speed and the MG rotation speed at the time of switching from the electric traveling to the hybrid traveling according to the present embodiment. The graph in the middle part of FIG. 7 shows changes in a command value and the actual value of the engine torque at the time of the switching according to the present embodiment. The graph in the lower part of FIG. 7 shows changes in a command value and the maximum value of the system shaft torque at the time of the switching according to the present embodiment. The graph in the lower part of FIG. 7 also shows changes in the maximum MG torque. As in the case of FIG. 3, engagement of the system clutch 15 is started at time t0, and an increase in the engine rotation speed by cranking is started at time t1 in the case of FIG. 7. At time t2, the engine 11 is restarted. At time t3, engagement of the system clutch 15 is completed. Further, in the case of FIG. 7, activation of the catalyst 18 is completed at time t4, and the electronic control unit 30 issues a command to increase the engine torque in response to the travel request at time t4. The actual engine torque starts increasing at time t5 in response to the command issued at time t4.

When the catalyst 18 is partially warmed up at time t23 (time t23 being earlier than time t3, at which the engagement of the system clutch 15 is completed), the electronic control unit 30 changes the throttle opening degree TA of the engine 11 from the starting opening degree to the specified-amount opening degree TACON. As described above, the specified-amount opening degree TACON is calculated based on the atmospheric pressure PA as the throttle opening degree TA at which the intake air amount of the engine 11 becomes a specified amount X. Therefore, the intake air amount of the engine 11 at time t4, at which an increase in the engine torque is commanded in response to a travel request, is a constant amount regardless of the level of the atmospheric pressure PA. That is, the engine torque at time t4 is constant regardless of the level of the atmospheric pressure PA. Therefore, even at a high altitude, at which the atmospheric pressure PA is relatively low, the system shaft torque does not fall below the command value around time t5.

The present embodiment has the following advantages.

(1) When switching from the electric traveling to the hybrid traveling, the electronic control unit 30 controls the throttle opening degree TA at the time of completion of engagement of the system clutch 15 such that the throttle opening degree TA is greater when the atmospheric pressure PA is relatively low than when the atmospheric pressure PA is relatively high. Thus, the intake air amount of the engine 11 when an increase in the engine torque is commanded in response to a travel request is unlikely change due to the level of the atmospheric pressure PA. This prevents acceleration of the hybrid electric vehicle from being sluggish under a low atmospheric pressure environment.

(2) Based on the atmospheric pressure PA, the electronic control unit 30 calculates the specified-amount opening degree TACON, at which the intake air amount of the engine 11 is the specified amount. The electronic control unit 30 controls the throttle opening degree TA such that the specified-amount opening degree TACON is the opening degree at the time of completion of engagement of the system clutch 15. Thus, regardless of the atmospheric pressure PA, the intake air amount of the engine 11 is constant when an increase in the engine torque is commanded in response to a travel request. Therefore, the acceleration performance of the hybrid electric vehicle is readily kept constant regardless of the level of the atmospheric pressure PA.

(3) The electronic control unit 30 sets the specified-amount opening degree TACON so as to obtain an intake air amount that satisfies the following requirements: a) the engine 11 discharges an amount of exhaust gas that can be purified by the catalyst 18 in a partially activated state; and b) the torque shock generated when the system clutch 15 is engaged falls within an allowable range. This prevents the emission and drivability of the engine 11 from being degraded.

(4) In the present embodiment, when the traveling mode is switched from the electric traveling mode to the hybrid traveling mode, the electronic control unit 30 controls the torque of the motor generator 12 in the following manner. The electronic control unit 30 controls the torque of the motor generator 12 such that the system shaft torque increases at a constant gradient during the period from the restart of the engine 11 to the issuance of a command to increase the engine torque in response to a travel request of the hybrid electric vehicle. In order to ensure the acceleration performance of the hybrid electric vehicle, it is desirable to increase the system shaft torque as much as possible by the start of increase in the engine torque in response to a travel request. It is possible to smoothly increase the system shaft torque during that period by controlling the torque of the motor generator 12. However, if the engine torque changes in accordance with the atmospheric pressure PA, it is difficult to increase the system shaft torque. In addition, if the gradient of increase in the system shaft torque is set within an achievable range even when the atmospheric pressure PA is low, the increase in the system shaft torque becomes slow and the acceleration performance of the hybrid electric vehicle is limited. With the present embodiment, such problems are unlikely to occur since the engine torque is ensured regardless of the level of the atmospheric pressure PA.

The above-described embodiment may be modified as follows. The above-described embodiment and the following modifications can be combined as long as the combined modifications remain technically consistent with each other.

In the above-described embodiment, the specified-amount opening degree TACON is set to an opening degree at which the intake air amount of the engine 11 is constant regardless of the level of the atmospheric pressure PA. The acceleration of the hybrid electric vehicle is prevented from being sluggish at a high altitude if the specified-amount opening degree TACON is set to be greater when the atmospheric pressure PA is relatively low than when the atmospheric pressure PA is relatively high, despite changes in the intake air amount due to the atmospheric pressure PA.

In the above-described embodiment, partial activation and the completion of activation of the catalyst 18 are determined based on the elapsed time from restart of the engine 11. These determinations may be made by other methods. For example, the determinations may be made based on a catalyst bed temperature.

In the above-described embodiment, the throttle opening degree TA is changed from the starting opening degree to the specified-amount opening degree TACON when the catalyst 18 is partially activated. The throttle opening degree TA may be changed from the starting opening degree to the specified-amount opening degree TACON at time other than that in the above-described embodiment, as long as that time is before the completion of engagement of the system clutch 15.

The electronic control unit 30 is not limited to one that performs various processes according to programs. For example, the electronic control unit 30 may include a dedicated hardware circuit (for example, an application-specific integrated circuit (ASIC)) that executes at least part of the processes executed in the above-described embodiment. That is, the electronic control unit 30 may be processing circuitry that includes any one of the following configurations (a) to (c).

(a) Processing circuitry including a processor that executes all of the above-described processes according to programs and a program storage device such as a ROM that stores the programs.

(b) Processing circuitry including a processor and a program storage device that execute part of the above-described processes according to the programs and a dedicated hardware circuit that executes the remaining processes.

(c) Processing circuitry including a dedicated hardware circuit that executes all of the above-described processes.

Multiple software processing devices each including a processor and a program storage device and multiple dedicated hardware circuits may be provided.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller configured to control a hybrid electric vehicle that includes a hybrid system as a drive source, the hybrid system including an engine and a motor generator, wherein
   the hybrid system includes a clutch disposed between an output shaft of the engine and a rotary shaft of the motor generator and is configured to extract drive force from the rotary shaft of the motor generator,
   the engine includes a catalyst configured to purify exhaust gas of the engine,
   the hybrid electric vehicle has two traveling modes that include an electric traveling mode, in which the hybrid electric vehicle travels with the engine in a stopped state and the clutch disengaged, and a hybrid traveling mode, in which the hybrid electric vehicle travels with the clutch engaged,
   the vehicle controller includes processing circuitry,
   the processing circuitry is configured to, when the traveling mode is switched from the electric traveling mode to the hybrid traveling mode,
      set a throttle opening degree of the engine to a specified starting opening degree until an elapsed time from a restart of the engine reaches a specified partial activation determination value, the specified partial activation determination value being set to a time shorter than a predicted value of a required time from the restart of the engine to completion of engagement of the clutch, and
      set the throttle opening degree to a specified-amount opening degree, at which an intake air amount of the engine is constant in relation to an atmospheric pressure, until the elapsed time from the restart of the engine reaches a specified activation completion determination value after exceeding the specified partial activation determination value, the specified activation completion determination value being set to a time longer than the predicted value, and
   the processing circuitry is configured to set the specified-amount opening degree so as to obtain the intake air amount that satisfies a requirement that the engine discharges the exhaust gas in an amount purifiable by the catalyst in a partially activated state.

2. The vehicle controller according to claim 1, wherein the processing circuitry is configured to set the specified-amount opening degree so as to obtain the intake air amount that further satisfies a requirement that a torque shock generated when the clutch is engaged falls within an allowable range.

3. The vehicle controller according to claim 1, wherein the processing circuitry is configured to control, when the traveling mode is switched from the electric traveling mode to the hybrid traveling mode, torque of the motor generator such that torque output by the hybrid system increases at a constant gradient during a period from the restart of the engine to when the processing circuitry commands an increase in torque of the engine in response to a travel request of the hybrid electric vehicle.

4. A vehicle control method for a hybrid electric vehicle that includes a hybrid system as a drive source, the hybrid system including an engine and a motor generator, wherein
   the hybrid system includes a clutch disposed between an output shaft of the engine and a rotary shaft of the motor generator and is configured to extract drive force from the rotary shaft of the motor generator,
   the engine includes a catalyst that purifies exhaust gas of the engine, and
   the method comprises:
   switching a traveling mode of the hybrid electric vehicle between an electric traveling mode, in which the hybrid electric vehicle travels with the engine in a stopped state and the clutch disengaged, and a hybrid traveling mode, in which the hybrid electric vehicle travels with the clutch engaged;
   when the traveling mode is switched from the electric traveling mode to the hybrid traveling mode,
      setting a throttle opening degree of the engine to a specified starting opening degree until an elapsed time from a restart of the engine reaches a specified partial activation determination value, the specified partial activation determination value being set to a time shorter than a predicted value of a required time from the restart of the engine to completion of engagement of the clutch, and
      setting the throttle opening degree to a specified-amount opening degree, at which an intake air amount of the engine is constant in relation to an atmospheric pressure, until the elapsed time from the restart of the engine reaches a specified activation completion determination value after exceeding the specified partial activation determination value, the specified activation completion determination value being set to a time longer than the predicted value; and
   setting the specified-amount opening degree so as to obtain the intake air amount that satisfies a requirement that the engine discharges the exhaust gas in an amount purifiable by the catalyst in a partially activated state.

5. The vehicle control method according to claim 4, wherein the method further comprises:
   setting the specified-amount opening degree so as to obtain the intake air amount that further satisfies a requirement that a torque shock generated when the clutch is engaged falls within an allowable range.

6. The vehicle control method according to claim 4, wherein the method further comprises:
   when the traveling mode is switched from the electric traveling mode to the hybrid traveling mode, controlling torque of the motor generator such that torque output by the hybrid system increases at a constant gradient during a period from the restart of the engine to when processing circuitry of the hybrid electric vehicle commands an increase in torque of the engine in response to a travel request of the hybrid electric vehicle.

* * * * *